July 20, 1926.
J. H. JOHNSON ET AL
1,593,337
WRENCH
Filed April 8, 1925
Fig. 1.
Fig. 2.
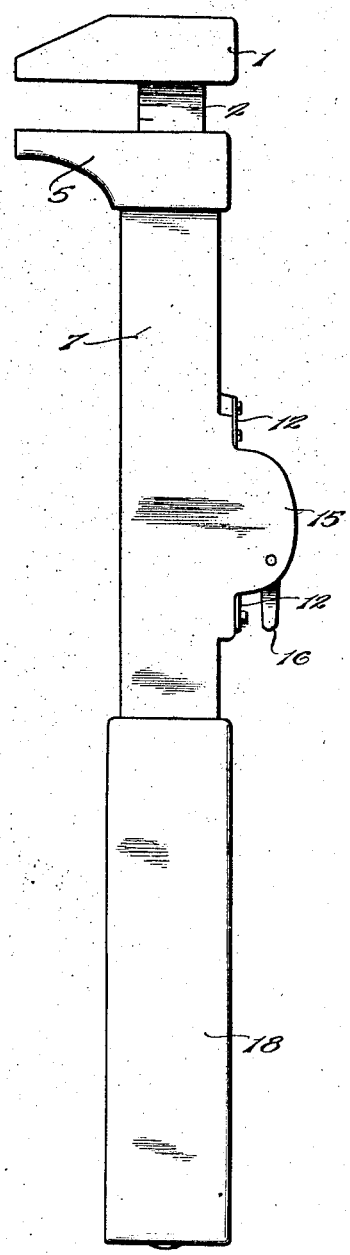
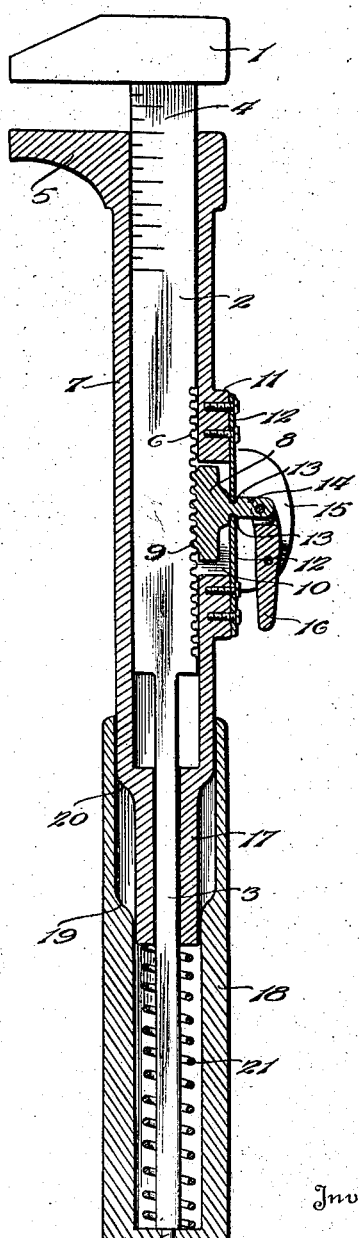
Inventors
J. H. Johnson
F. D. Ross
By Lacey & Lacey, Attorneys

UNITED STATES PATENT OFFICE.

JOHN H. JOHNSON AND FRED D. ROSS, OF FAY, OKLAHOMA.

WRENCH.

Application filed April 8, 1925. Serial No. 21,631.

Our invention relates to wrenches and has for its object the provision of a simple inexpensive construction whereby the movable member may be easily and quickly set to any desired position upon the relatively fixed member and securely held in the set position. The invention is illustrated in the accompanying drawing and will be hereinafter first fully described and then particularly pointed out in the appended claims.

In the drawing:

Figure 1 is an elevation of a wrench embodying our invention, and

Fig. 2 is a view partly in longitudinal section and partly in elevation.

The invention is illustrated as embodied in a nut wrench but it may, of course, be embodied in a pipe wrench, the only change required being to give the jaws the proper shape to perform the desired work. In the drawing, the relatively fixed jaw 1 is secured upon one end of a shank 2 which is preferably angular in cross section and has its end remote from the jaw reduced, as shown at 3. The shank 2 is provided upon its side immediately adjacent the jaw 1 with a scale of graduations 4 whereby to facilitate the proper adjustment of the movable jaw 5. The shank 2 is further provided upon its back edge with a longitudinal series of transverse teeth or notches 6, and a hollow sleeve member 7 is fixed to the movable jaw 5 and slidably encircles the shank 2, a dog 8 being carried by the sleeve 7 and provided with teeth 9 to cooperate with the notches 6 on the shank 2 and thereby hold the two wrench members in a set relation. The sleeve 7 is provided in one side with an opening 10 to accommodate the dog 8 and at the opposite ends of said opening are bosses or enlargements 11 upon which are secured leaf springs 12 extending across the opening and having their adjacent ends engaged in notches 13 in the opposite sides of the stem 14 which projects outwardly from the dog 8. The sleeve is further provided at the sides of the opening 10 with outstanding lugs or ears 15 and between the said lugs or ears is pivotally mounted a thumb piece or lever 16 which has its inner end pivotally connected to the end of the stem 14, as clearly shown in Fig. 2.

It will be readily understood that by pressing the free end of the thumb piece 16 toward the sleeve 7 the dog 8 will be disengaged from the rack 6 and the sleeve 7 may then be slid along the shank 2 so as to set the jaw 5 in a desired spaced relation to the jaw 1. When the desired adjustment of the jaws has been effected, the thumb piece is released and the springs 12 will then at once return the dog into engagement with the shank 2 to hold the parts relatively fixed. It is to be noted that the springs 12 are disposed at both sides of the stem 14 so that the stem is otherwise free and may move in a rectilinear path so as to squarely engage the notches in the shank and thereby firmly hold the parts in a set relation.

The end of the sleeve 7 remote from the jaw 5 is reduced, as shown at 17, and encircles the reduced extension 3 of the shank 2 closely but slidably. The reduced end 17 of the sleeve is also slidably fitted in and housed by a hollow handle member 18 which is secured on the end of the stem 3 so as to enclose the same and provide a convenient comfortable grip for the user of the tool. The end of the stem may be secured to the end of the hollow handle by any convenient means. The drawing shows the end of the stem as having a reduced portion or tenon 30 which is inserted through an opening provided therefor in the end of the handle and then upset after the parts have been assembled. An internal shoulder 19 is formed in the handle member to abut a mating shoulder 20 on the sleeve 7 so that the sleeve will be reinforced and supported when the jaws have been set for the maximum capacity of the wrench. A spring 21 is coiled around the stem 3 within the handle 18 and bears against the closed end of the handle and also against the extremity of the reduced end 17 of the sleeve. This spring acts constantly to move the jaw 5 toward the fixed jaw 1 and when the movable jaw is shifted from the fixed jaw, the spring is compressed so that all that has to be done to hold the jaws in the adjusted position is to release the thumb piece 16 and permit the dog 8 to engage the shank 2. The end of the stem 3 may be secured in the end of the handle 18 in any manner and is shown as being inserted through and upset on the end of the handle.

Our tool is exceedingly simple in construction and may be very quickly adjusted to the nut or bolt which is to be turned. It will be made in various sizes so that a wrench of any given capacity may be easily obtained.

Having thus described the invention, we claim:

1. A wrench comprising a shank having a jaw at one end and provided in one edge with a longitudinal series of transverse notches, a sleeve slidably fitted upon the shank and having a jaw at one end to cooperate with the jaw on the shank, the sleeve being provided with an opening through the side facing the notches in the shank, outstanding lugs on the sleeve at the sides of the opening therein, a thumb piece pivotally mounted upon and between the lugs, a dog disposed within the opening in the sleeve and provided with teeth to engage the notches in the shank and having an outwardly projecting stem pivoted to the thumb piece and provided with recesses in its opposite sides, and leaf springs secured upon the sleeve at the ends of the opening therein and extending over the opening to engage at their free ends in the recesses, in the sides of the stem and hold the dog in engagement with the shank.

2. A wrench comprising a shank having a jaw on one end and having a reduced extension at its opposite end, a hollow handle secured upon the extremity of said extension and housing the same, a sleeve slidably fitted upon the shank and having a jaw at one end to cooperate with the jaw on the shank, the opposite end of the sleeve being reduced and fitting within the hollow handle and slidably encircling the reduced extension of the shank, means carried by the sleeve to engage the shank and hold the jaws in a set relation, and an expansion spring coiled around the reduced extension of the shank within the hollow handle and acting against the reduced end of the sleeve.

In testimony whereof we affix our signatures.

JOHN H. JOHNSON. [L. S.]
FRED D. ROSS. [L. S.]